United States Patent [19]
Narisawa et al.

[11] Patent Number: 5,672,930
[45] Date of Patent: Sep. 30, 1997

[54] VIBRATION MOTOR

[75] Inventors: Tsutomu Narisawa, Saitama-ken; Michihiro Tobe; Takatoshi Ashizawa, both of Kawasaki, all of Japan

[73] Assignee: Nikon Corporation, Tokyo, Japan

[21] Appl. No.: 714,526

[22] Filed: Sep. 16, 1996

Related U.S. Application Data

[63] Continuation of Ser. No. 360,898, Dec. 21, 1994, abandoned.

[30] Foreign Application Priority Data

| Dec. 21, 1993 | [JP] | Japan | 5-321567 |
| Jan. 21, 1994 | [JP] | Japan | 6-005359 |
| Apr. 1, 1994 | [JP] | Japan | 6-65326 |

[51] Int. Cl.$^6$ .................................. H02N 2/00
[52] U.S. Cl. ............................ 310/323; 310/317
[58] Field of Search .................... 310/317, 323, 310/328

[56] References Cited

U.S. PATENT DOCUMENTS

| 4,742,260 | 5/1988 | Shimizu et al. | 310/323 |
| 5,039,899 | 8/1991 | Yamaguchi | 310/323 |
| 5,066,884 | 11/1991 | Takagi et al. | 310/323 |
| 5,101,132 | 3/1992 | Yamaguchi | 310/323 |
| 5,140,215 | 8/1992 | Yamaguchi | 310/323 |
| 5,146,129 | 9/1992 | Tamura et al. | 310/323 |
| 5,200,665 | 4/1993 | Iijima | 310/323 |
| 5,416,375 | 5/1995 | Funakubo et al. | 310/323 |
| 5,453,653 | 9/1995 | Zumeris | 310/323 |

FOREIGN PATENT DOCUMENTS

| 0294281 | 11/1988 | Japan | 310/323 |
| 0118780 | 5/1991 | Japan | 310/317 |
| 6-106028 | 12/1994 | Japan | H02N 2/00 |

OTHER PUBLICATIONS

Ultrasonic Motors Theory and Applictions, S. Ueha, Y. Tomikawa, M. Kurosawa, N. Nakamura, 1993, Clarendon Press, Oxfors, all pages.

Peizoelectric Linear Motors for Application to Driving a Light Pich–Up Element, Y. Tomikawa, M. Aoyagi, T. Ogasawara, A. Yabukl, Jun. 6–11, 1993, Tohoku Institute of Technology, Sandai.

*Primary Examiner*—Thomas M. Dougherty

[57] ABSTRACT

A vibration linear motor utilizing a composite vibration of a bending vibration and a longitudinal vibration, provided with a plate-shaped elastic member having a plate-shaped main body portion and a pair of driving force output portions provided on the surface of the main body portion for driving a driven object; and an electromechanical converting element adhered to the elastic member and adapted to generate the composite vibration, wherein the electromechanical converting element is provided on the surface, between the paired driving force output portions, of the main body portion.

14 Claims, 16 Drawing Sheets

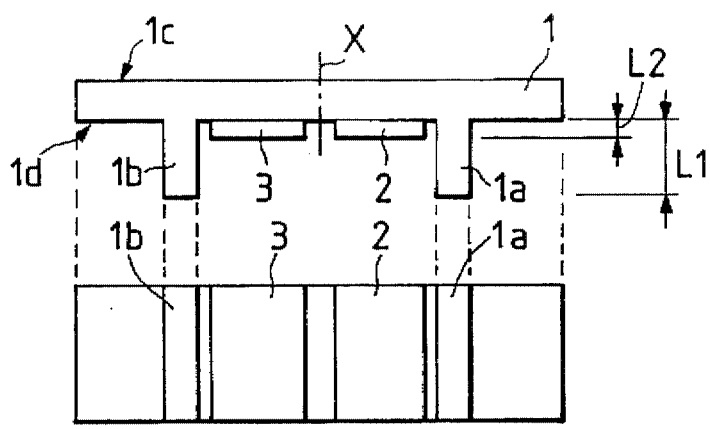
FIG. 1A
FIG. 1B
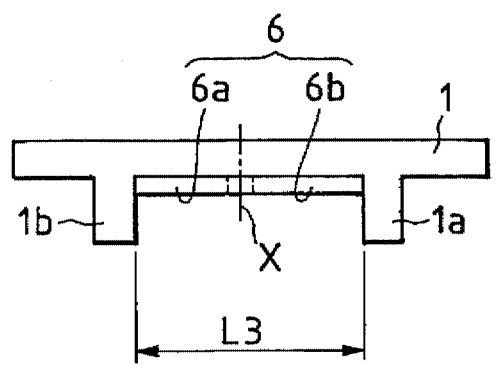
FIG. 2
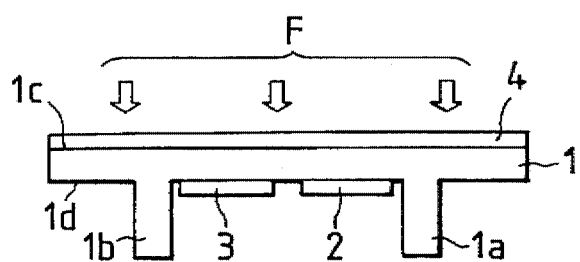
FIG. 3
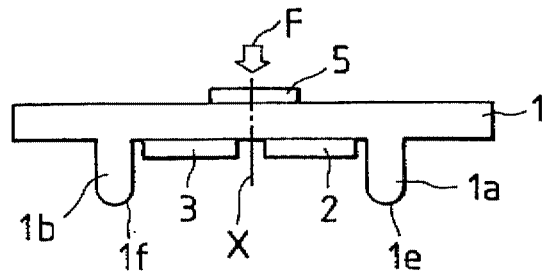
FIG. 4

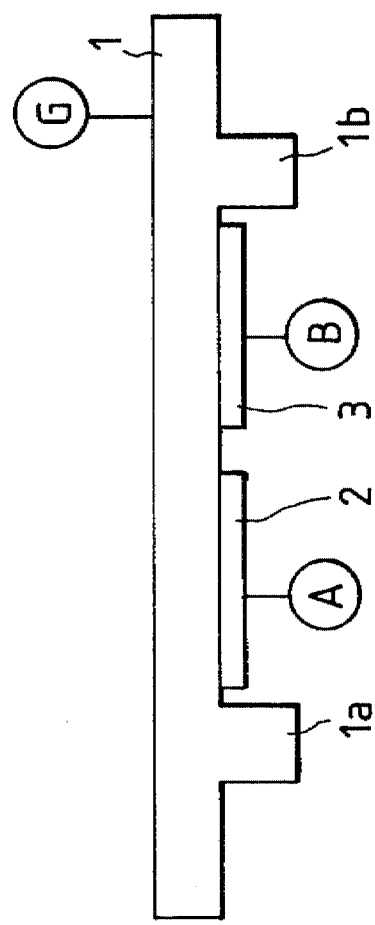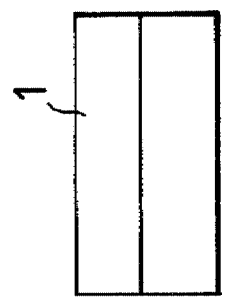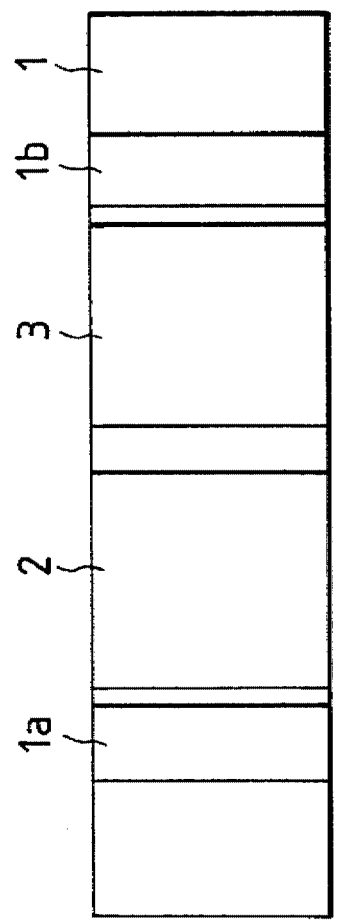

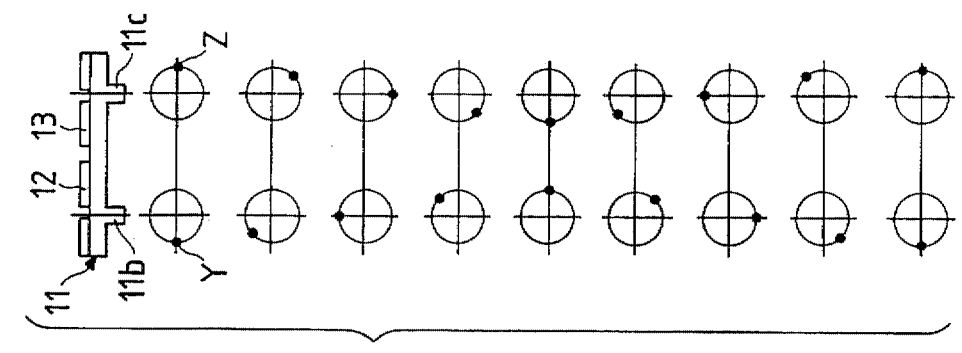
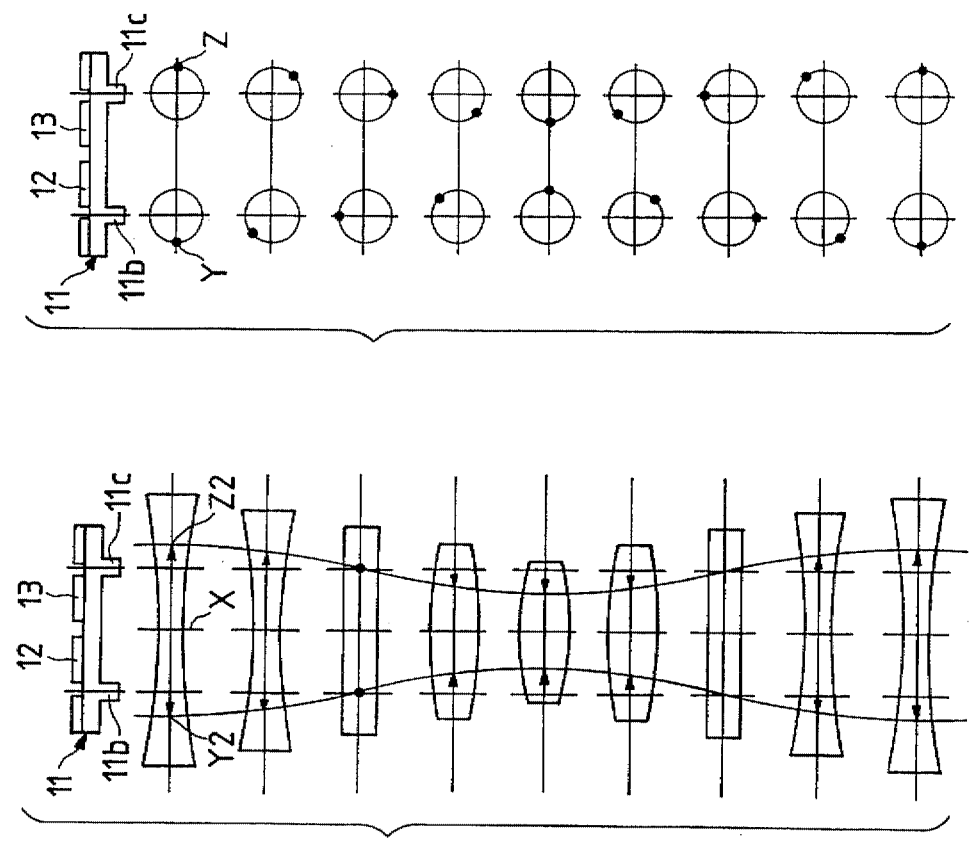
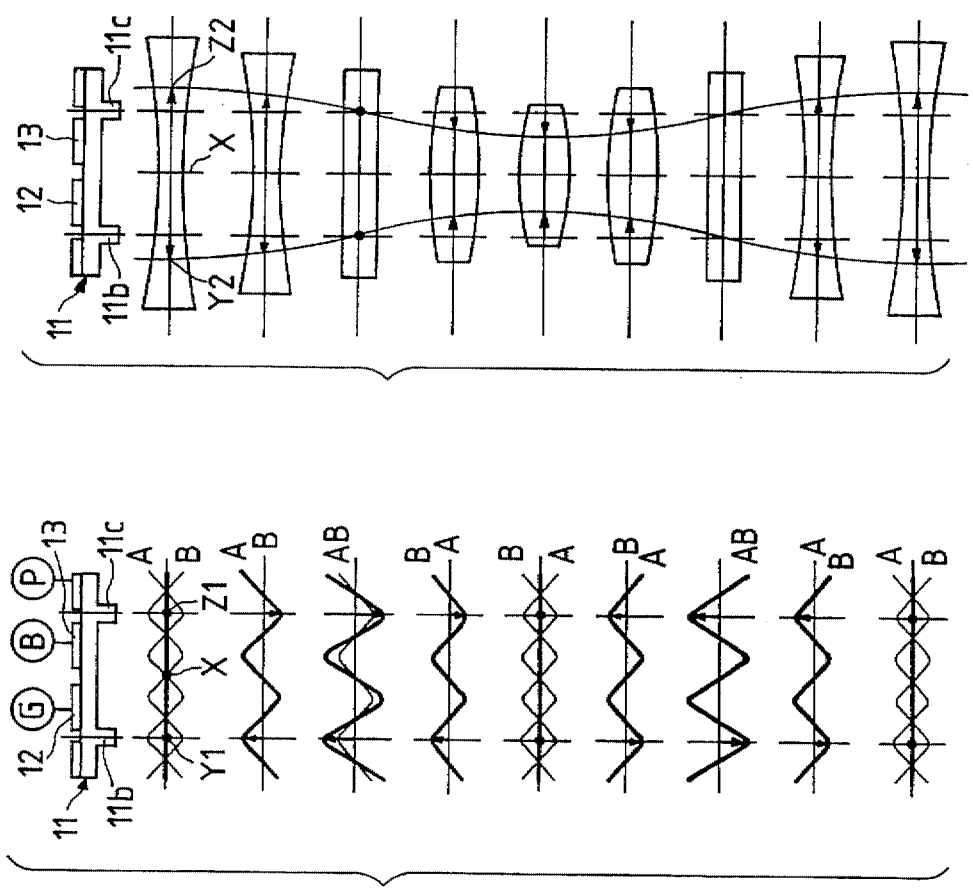
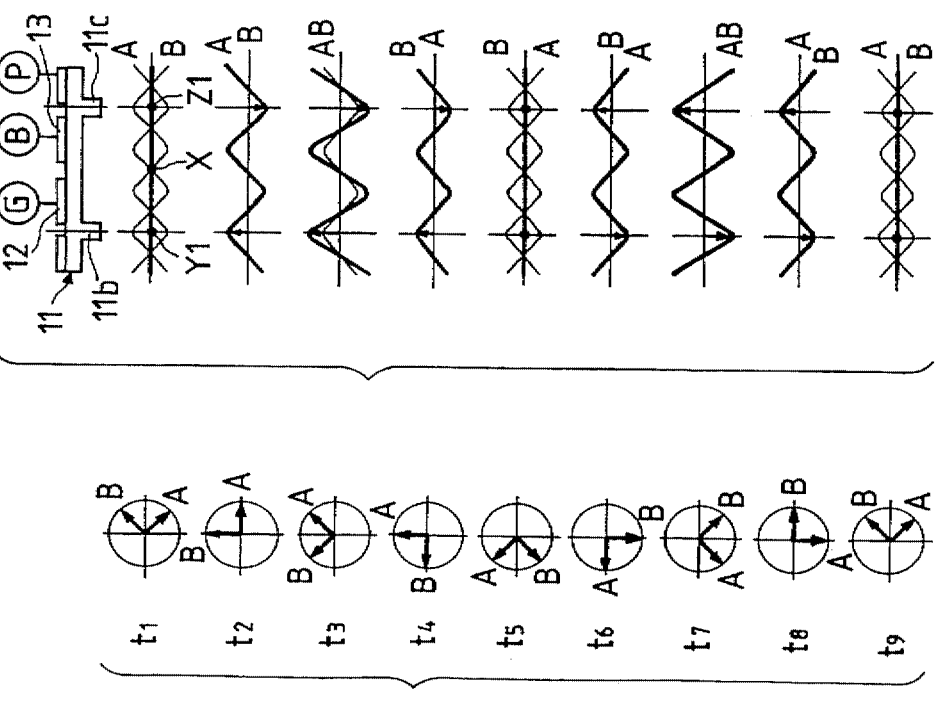

MAIN PIEZOELECTRIC MEMBER
+
SUB PIEZOELECTRIC MEMBER

MAIN PIEZOELECTRIC
MEMBER ONLY

MAIN PIEZOELECTRIC MEMBER
−
SUB PIEZOELECTRIC MEMBER

FIG. 20

[INPUT TO SWITCHING ELEMENT]

$\begin{pmatrix} 1 \rightarrow \text{INPUT (ON)} \\ 0 \rightarrow \text{NONE (OFF)} \end{pmatrix}$

| SPEED | $Q_1$ | $Q_2$ | $Q_3$ | $Q_4$ | $Q_5$ | $Q_6$ | MAIN | SUB L | SUB R |
|---|---|---|---|---|---|---|---|---|---|
| SLOW | 0 | 0 | 0 | 1 | 1 | 1 | NORMAL | INVERTED | INVERTED |
| SOMEWHAT SLOW | 0 | 0 | 0 | 1 | 1 | 0 | NORMAL | INVERTED | NONE |
| NORMAL | 0 | 0 | 0 | 0 | 0 | 0 | NORMAL | NONE | NONE |
| SOMEWHAT FAST | 1 | 1 | 0 | 0 | 0 | 0 | NORMAL | NORMAL | NONE |
| FAST | 1 | 1 | 1 | 0 | 0 | 0 | NORMAL | NORMAL | NORMAL |

VIBRATION MOTOR

This application is a continuation, of application Ser. No. 08/360,898, filed Dec. 21, 1994, now abandoned.

BACKGROUND OF THE INVENTION

1. Field of the Invention

The present invention relates to a linear vibration motor utilizing a composite vibration of a bending vibration and a longitudinal vibration.

2. Related Background Art

A linear ultrasonic vibration motor as shown in FIGS. 21A, 21B and 21C has been reported at the Japan Mechanical Society/Electrical Society/Japan AEM Society. In the Reports of the 5th Electromagnetic Force Related Dynamics Symposium of this Society, a report 222 "Piezoelectric Linear Motors for Application to Driving a Light Pick-Up Element" describes a flat motor utilizing composite vibration of longitudinal L1—bending B4 mode.

This flat motor utilizes two-phase drive of a longitudinal L1 mode and a bending B4 mode of a rectangular flat plate, and obtains a driving force by the obtained elliptical deformation.

FIG. 22 illustrates a conventional example of the vibration linear motor.

In such a conventional vibration linear motor, an oscillating vibrator 102 is provided at an end of a rod-shaped elastic member 101, and a damping vibrator 103 is provided at the other end. Piezoelectric members 102a, 103a are respectively adhered to the vibrators 102, 103. An AC voltage is applied from an oscillator 102b to the oscillating piezoelectric member 102a to generate a vibration in the rod-shaped elastic member 101, and the vibration propagates in the rod-shaped elastic member 101 to constitute a travelling wave, which thus drives a movable member 104 maintained in pressure contact with the rod-shaped elastic member 101.

On the other hand, the vibration of the rod-shaped elastic member 101 is transmitted, through the damping vibrator 103, to the piezoelectric member 103a, which converts the vibrating energy into electric energy. Thus, the vibration is absorbed by consumption of the electric energy by a load 103b connected to said piezoelectric member 103a. The damping vibrator 103 suppresses the reflection at the end face of the rod-shaped elastic member 101, thereby preventing generation of a standing wave in a specific mode of the elastic member 101.

In the vibration linear motor shown in FIG. 22, the rod-shaped elastic member 101 has to be extended over the entire moving range of the movable member 104, and the entire elastic member 101 has to be oscillated, so that the motor becomes inevitably bulky. Also, it is associated with a drawback of requiring the damping vibrator 103 for preventing the generation of the standing wave in the specific mode.

SUMMARY OF THE INVENTION

The present invention is to provide a vibration motor utilizing a composite vibration of a bending vibration and a longitudinal vibration, comprising:

a plate-shaped elastic member provided with a plate-shaped main body portion and a pair of driving force output units provided on the surface of said main body portion for driving a driven object; and an electromechanical converting element adhered to said elastic member for generating said composite vibration therein;

wherein said electromechanical converting element is provided on the surface of said main body portion, between said paired force output driving force units.

The present invention, by the presence of the electromechanical converting element between the paired driving force output units of the vibration motor, can prevent damage a load application or of unexpected impact, and difficulties in manufacturing.

Also, according to the present invention, an electromechanical converting element is adhered to another face of the elastic member, in order to enhance the deformation by the bending vibration and/or the longitudinal vibration.

BRIEF DESCRIPTION OF THE DRAWINGS

FIGS. 1A and 1B are respectively a cross-sectional view and a plan view of an vibration motor constituting a first embodiment of the present invention;

FIG. 2 is a cross-sectional view of an vibration motor constituting a second embodiment of the present invention;

FIG. 3 is a cross-sectional view of an vibration motor constituting a third embodiment of the present invention;

FIG. 4 is a cross-sectional view of an vibration motor constituting a fourth embodiment of the present invention;

FIGS. 5A, 5B and 5C are respectively a cross-sectional view, a plan view and a lateral view of an vibration motor embodying the present invention;

FIGS. 15A, 15B, 15C and 15D are views showing the driving operation of the vibration actuator according to the tenth embodiment of the present invention;

FIG. 20 is a view showing the function of the switching unit of the vibration actuator of the tenth embodiment;

DETAILED DESCRIPTION OF THE PREFERRED EMBODIMENTS

In the following there will be explained the working principle of an vibration linear motor, with reference to FIGS. 5A, 5B, 5C, 6A, 6B and 6C.

The vibration linear motor (hereinafter simply called vibration motor) includes a plate-shaped elastic member 1, a pair of driving force output units 1a, 1b, and piezoelectric elements (such as of PZT) 2, 3. In this vibration motor, by the application of high-frequency voltages A, B to the two piezoelectric elements 2, 3, a composite vibration of a bending vibration and a longitudinal vibration is generated on the plate-shaped elastic member 1, thereby generating elliptical movements on the ends of the driving force output units 1a, 1b and thereby generating a driving force. G indicates ground. The two piezoelectric elements 2, 3 are so polarized that they have a same polarity, and the high-frequency voltages A, B have a mutual phase difference of $\pi/2$. However, the two piezoelectric elements 2, 3 may also be polarized in the mutually opposite directions.

Figure 6D:
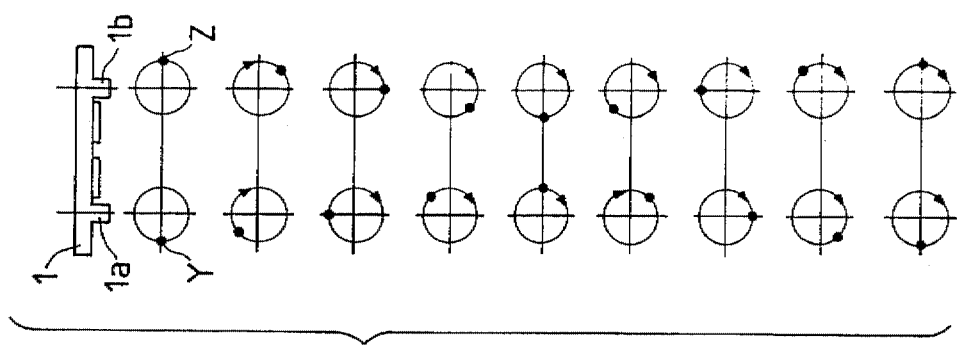
FIGS. 6A, 6B, 6C and 6D are views showing the principle of the vibration motor embodying the present invention.
Figure 6C:
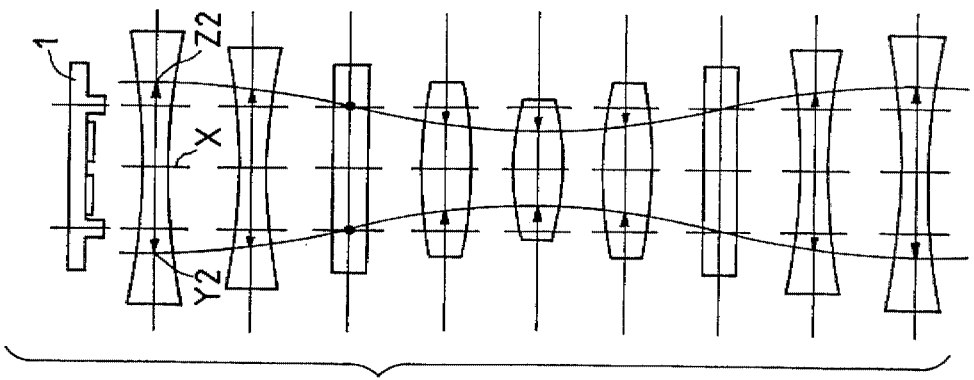
Figure 6B:
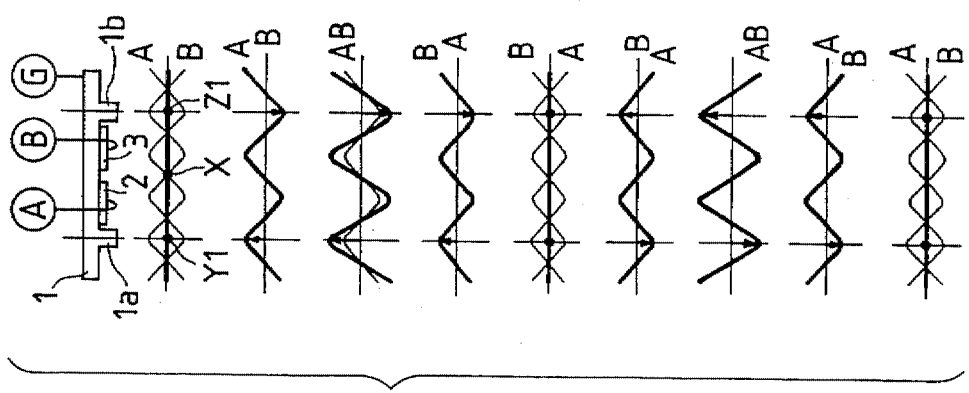
Figure 6A:
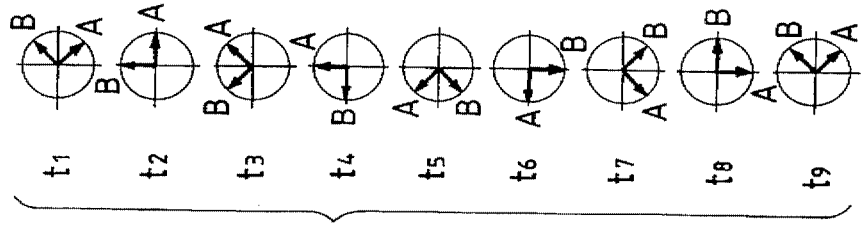

FIG. 6A shows, in t1 to t9, the change in time of the two-phase high-frequency voltages A, B supplied to the vibration motor, wherein the abscissa indicates the effective value of the high-frequency voltages. FIG. 6B shows the deformation of the cross section of the vibration motor, and indicates the variation in time (t1 to t9) of the bending vibration generated in the vibration motor. FIG. 6C shows the deformation of the cross section of the vibration motor, and indicates the variation in time (t1 to t9) of the longitudinal vibration generated in the vibration motor. FIG. 6D indicates the variation in time (t1 to t9) of the elliptical movement generated in the driving force output units 1a, 1b of the vibration motor.

Now, the function of the vibration motor will be explained, following the change in time (t1 to t9).

At a time t1, as shown in FIG. 6A, the high-frequency voltage A assumes a positive value while the high-frequency voltage B assumes a same positive value. As shown in FIG. 6B, the bending vibrations by the high-frequency voltages A, B mutually cancel, whereby the amplitude becomes zero at mass points Y1 and Z1. Also as shown in FIG. 6C, the high-frequency voltages A, B generates a longitudinal vibration in the extending direction, and mass points Y2 and Z2 show a maximum elongation, as indicated by arrows, with the center at a node X. As a result, these vibrations are synthesized as shown in FIG. 6D, whereby a mass point Y is given by the synthesis of the mass points Y1 and Y2 while a mass point Z is given by the synthesis of the mass points Z1 and Z2.

At a time t2, as shown in FIG. 6A, the high-frequency voltage B becomes zero while the high-frequency voltage A assumes a positive value. As shown in FIG. 6B, the high-frequency voltage A generates a bending vibration whereby the mass points Y1 and Z1 respectively vibrate in the positive and negative directions. Also as shown in FIG. 6C, the high-frequency voltage A generates a longitudinal vibration whereby the distance of the mass points Y2 and Z2 contracts in comparison with that at t1. These two vibrations are synthesized whereby the mass points Y and Z move clockwise in comparison with the state at t1.

At a time t3, as shown in FIG. 6A, the high-frequency voltage A assumes a positive value while the voltage B assumes a same negative value. As shown in FIG. 6B, the bending vibrations by the voltages A, B are synthesized and amplified, whereby the mass point Y1 moves more in the positive direction than at t2 to assume a maximum positive amplitude, while the mass point Z1 moves more in the negative direction than at t2 to assume a maximum negative amplitude. Also as shown in FIG. 6C, the longitudinal vibrations by the voltages A, B mutually cancel whereby the mass points Y2, Z2 return to the original positions. These two vibrations are synthesized whereby the mass points Y and Z move clockwise from the state at t2, as shown in FIG. 6D.

At time t4, as shown in FIG. 6A, the high-frequency voltage A becomes zero while the high-frequency voltage B assumes a negative value. As shown in FIG. 6B, the voltage B generates a bending vibration whereby the mass point Y1 assumes an amplitude less than at t3 while the mass point Z1 assumes an amplitude less than at t3. Also as shown in FIG. 6C, the voltage B generates a longitudinal vibration, whereby the distance of the mass points Y2 and Z2 contracts. As a result, these vibrations are synthesized whereby the mass points Y and Z move clockwise from the state at t3, as shown in FIG. 6D.

At a time t5, as shown in FIG. 6A, the high-frequency voltage A assumes a negative value while the high-frequency voltage B assumes a same negative value. As shown in FIG. 6B, the bending vibrations by the voltages A, B mutually cancel, whereby the amplitude becomes zero at the mass points Y1 and Z1. Also as shown in FIG. 6C, the voltages A, B generate a longitudinal vibration in the contracting direction, and the mass points Y2, Z2 show a maximum contraction, as indicated by arrows, with the center at the node X. These vibrations are synthesized whereby the mass points Y, Z move clockwise from the state at t4, as shown in FIG. 6D.

Also in a period from t6 to t9, the bending and longitudinal vibrations are generated in a similar manner as explained above, and, as a result, the mass points Y, Z move clockwise and effect elliptical movements.

Based on the above-explained principle, the vibration motor generates elliptical movements at the ends of the driving force output units 1a, 1b, thereby generating a driving force.

[First embodiment]

Now there will be explained a first embodiment of the present invention, with reference to FIGS. 1A and 1B, which are respectively a cross-sectional view and a plan view thereof.

As shown in FIGS. 1A and 1B, the vibration motor includes an elastic member 1, a pair of driving force output portions 1a, 1b, and piezoelectric members 2, 3. The elastic member 1 is a flat plate-shaped member, and provided on the lower face 1d thereof with a pair of driving force output portions 1a, 1b, symmetrical with respect to a node X of the longitudinal vibration. The piezoelectric members 2, 3 are adhered, between the paired driving force output portions 1a, 1b, on the lower face 1d of the elastic member 1 and are positioned symmetrically with respect to the node X.

The thickness L2 of the piezoelectric members 2, 3 is selected smaller than the length L1 of the paired driving force output portions 1a, 1b.

By the application of two-phase high-frequency voltages to the piezoelectric members 2, 3, the vibration motor generates elliptical movements at the ends of the driving force output portions 1a, 1b, and can therefore move when the motor is placed with the driving force output portions 1a, 1b at the bottom.

In such a self running motion of the vibration motor, the piezoelectric members 2, 3 are protected from external shock as they are positioned between the driving force output portions 1a, 1b. Also the piezoelectric members 2, 3 can be easily adhered as their positions can be easily determined in relation to the driving force output portions 1a, 1b.

[Second embodiment]

Now there will be explained a second embodiment of the present invention, with reference to FIG. 2.

The second embodiment represents an improvement on the basic configuration of the vibration motor of the foregoing first embodiment.

In the second embodiment, a piezoelectric member 6 is composed of a single piezoelectric element, which is subjected to a polarizing process to form piezoelectric members 6a and 6b, which are constructed symmetrically with respect to the node X. The length of the piezoelectric member 6 is approximately equal to the distance L3 between the driving force output portions 1a, 1b.

Consequently, in the adhesion of the piezoelectric member 6 onto the elastic member 1, the piezoelectric member 6 can be properly positioned by simple dropping between the driving force output portions 1a, 1b, so that the adhering process can be significantly simplified in the manufacturing process.

[Third embodiment]

Now a third embodiment of the present invention will be explained with reference to FIG. 3.

The third embodiment represents an improvement on the basic configuration of the ultrasonic vibration motor of the foregoing first embodiment.

Referring to FIG. 3, the vibration motor includes an elastic member 1, a pair of driving force output portions 1a, 1b, piezoelectric members 2, 3 and a felt member 4 having a shock-absorbing function. The felt member 4 is adhered to the upper face 1c of the elastic member 1, and has a size comparable to that of the upper face 1c.

A driven object, when placed and fixed on the felt member 4, can be driven by the driving force of the vibration motor. Also, the driving force (torque) of the vibration motor can be improved by pressurization with a force F, with a pressing member from above the felt member 4.

Consequently, the present embodiment allows effective utilization of the upper face 1c of the elastic member 1, and facilitates the positioning of the driven object or of the pressing member.

[Fourth embodiment]

Now there will be explained a fourth embodiment of the present invention, with reference to FIG. 4.

The fourth embodiment represents an improvement on the basic configuration of the vibration motor of the foregoing first embodiment.

Referring to FIG. 4, the vibration motor includes of an elastic member 1, a pair of driving force output portions 1a, 1b, piezoelectric members 2, 3 and a felt member 5 with a shock-absorbing function.

The felt member 5 is adhered on a small area, on the upper face 1c of the elastic member 1, on a node X thereof.

A driven object, when placed and fixed on the felt member 5, can be driven by the driving force of the vibration motor. Also, the driving force (torque) of the vibration motor can be improved by pressurization with a force F, with a pressing member from above the felt member 5.

Consequently, the fourth embodiment allows effective utilization of the upper face 1c of the elastic member 1, and facilitates the positioning of the driven object or of the pressing member.

In particular, since the node X of the elastic member 1 is a portion not influenced by the vibration of the vibration motor, the positioning of the driven object or of the pressing member in this position allows for the driving force of the vibration to be effectively maintained, without deteriorating the efficiency thereof.

The present invention is not limited to the above-explained embodiments, but the combination of the piezoelectric member and the felt member therein can be suitably modifiable and the piezoelectric member can be further divided into plural portions.

In the foregoing embodiments, the positioning of the piezoelectric member between the paired driving portions of the vibration motor allows for:

1) the protection of the piezoelectric member from the external shock;
2) the facilitation of the positioning of the piezoelectric member at the adhering operation, thereby simplifying the adhering operation; and
3) the effective utilization of the upper face of the elastic member.

[Fifth embodiment]

Figure 7:
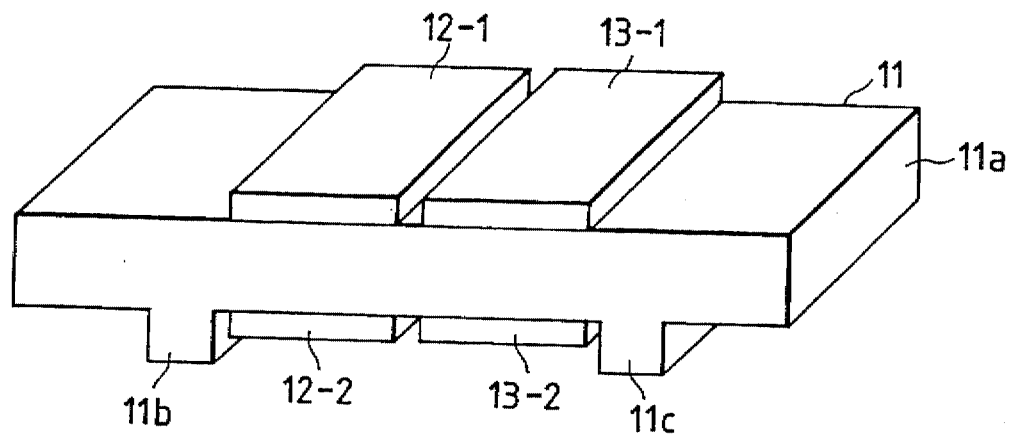
FIG. 7 is a schematic view of a fifth embodiment of the vibration motor of the present invention.

In the following there will be given a detailed explanation of a fifth embodiment, with reference to the attached drawings. FIG. 7 is a schematic view of the fifth embodiment of the vibration motor of the present invention.

An elastic member 11 is provided with a base portion 11a and two protruding portions (driving force output portions) 11b, 11c, and, on the base portion 11a, there are provided for electrically insulated piezoelectric elements 12-1, 12-2, 13-1, 13-2 for generating a longitudinal vibration of L1 mode and a bending vibration of B4 mode. The functions of the components are the same as those shown in FIGS. 21A, 21B and 21C. The piezoelectric elements 12-1, 13-1 are adhered on a face, opposite to the driving face, of the elastic member 11, and the piezoelectric elements 12-2, 13-2 are adhered on a face between the protruding portions 11b, 11c on the driving face of the elastic member 11.

Figure 8:
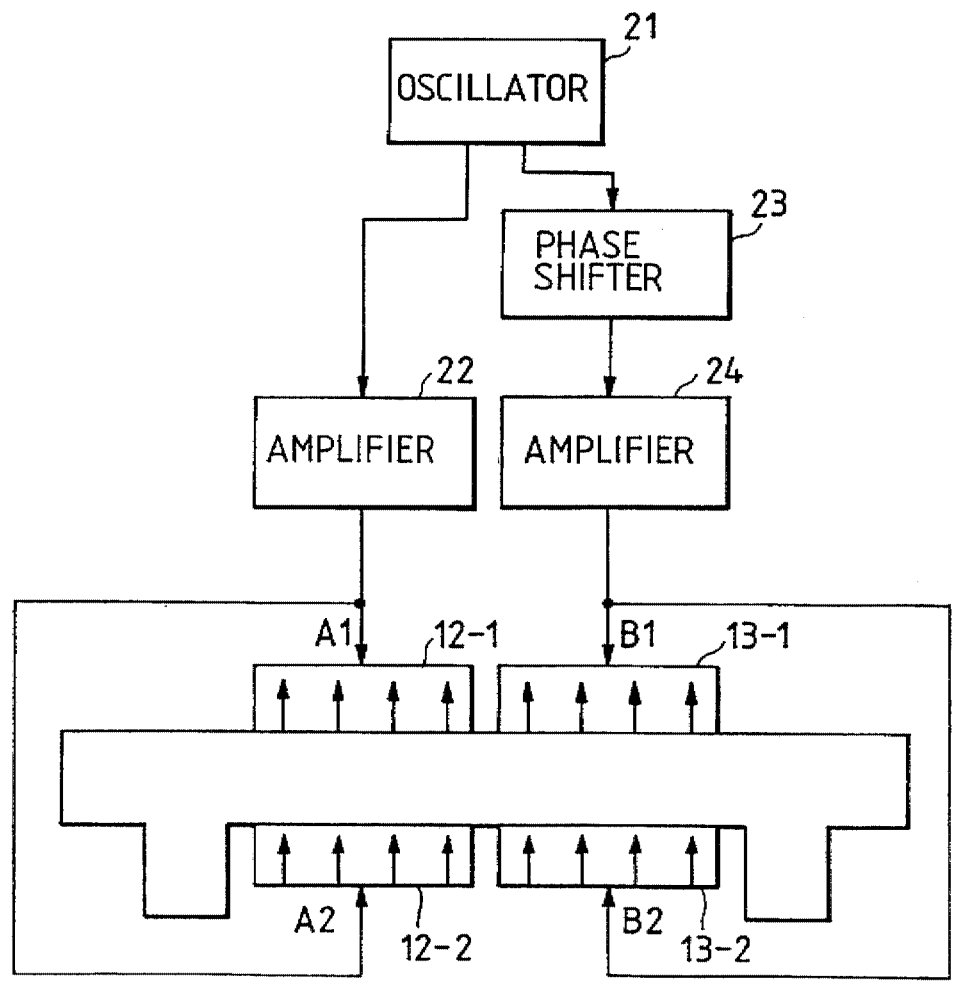
FIG. 8 is a block diagram showing the driving circuit of the vibration motor of the fifth embodiment.

FIG. 8 is a block diagram showing the driving circuit for the vibration motor of the fifth embodiment. In this embodiment, the piezoelectric elements 12-1, 12-2, 13-1, 13-2 are polarized as shown in FIG. 8.

More specifically, the piezoelectric elements 12-1, 12-2 are polarized in such a manner that either one of said elements expands while the other contracts under the application of an AC voltage of a same phase to both elements. Also, the piezoelectric elements 13-1, 13-2 are polarized in a similar manner as in the elements 12-1, 12-2.

As shown in FIG. 8, an oscillator 21 generates a driving AC voltage, which is supplied to the piezoelectric elements 12-1, 12-2 after amplification by an amplifier 22 and is also supplied to the piezoelectric elements 13-1, 13-2 after a phase shift by 90° by a phase shifter 23 and amplification by an amplifier 24, whereby two-phase input voltages A, B are applied as will be explained later with reference to FIG. 9A. Since the voltages of the phase A and the phase B are respectively supplied to the piezoelectric elements 12-1, 12-2 and to the elements 13-1, 13-2, these elements will be simply called the elements A and the elements B in the following description.

As shown in FIGS. 9A to 9D, this vibration motor generates a composite vibration of a bending vibration and a longitudinal vibration by the application of the high-frequency voltages A, B, respectively, to the piezoelectric elements 12 (12-1 and 12-2), 13 (13-1 and 13-2), thereby inducing elliptical movements at the ends of the protruding portions 11b, 11c and thus generating a driving force. G indicates the ground. The two piezoelectric elements 12, 13 are so polarized that they have a same polarizing direction, and the high-frequency voltages A, B have a mutual phase difference of $\pi/2$. However the piezoelectric elements 12, 13 may also be polarized in mutually opposite directions.

Figure 9D:
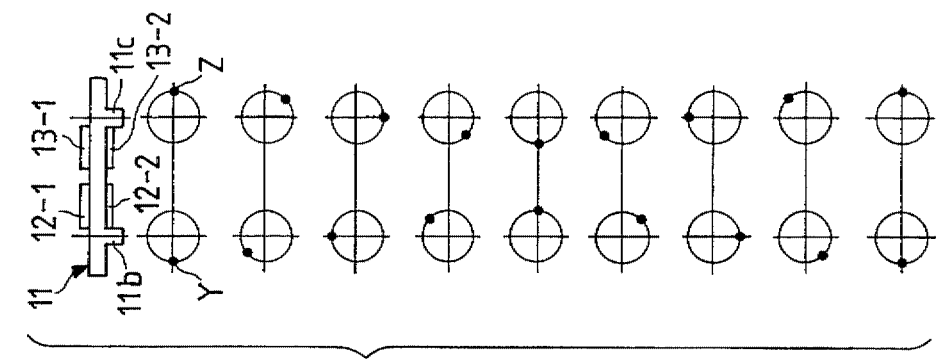
FIGS. 9A, 9B, 9C and 9D are views showing the driving operation of the vibration motor of the first embodiment.
Figure 9C:
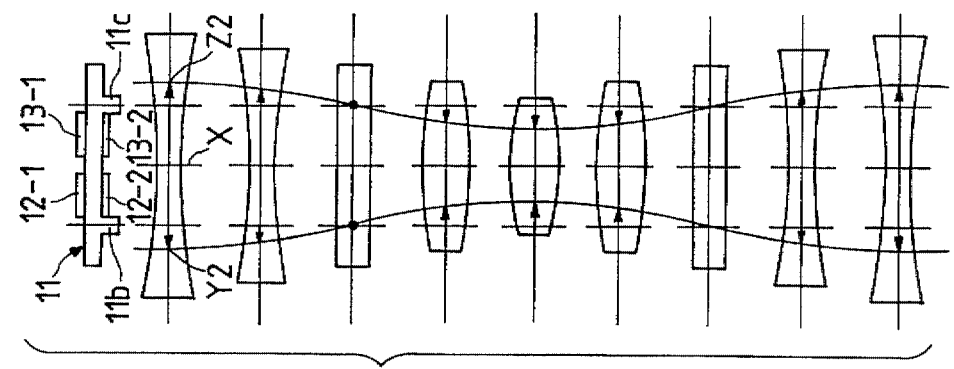
Figure 9B:
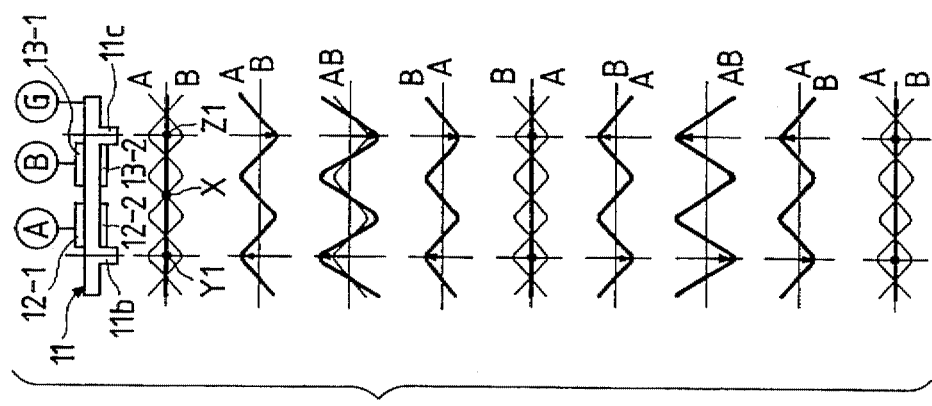
Figure 9A:
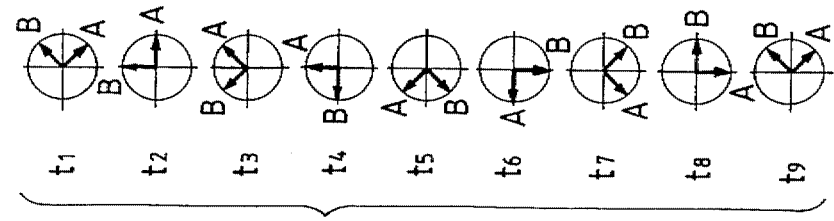

FIG. 9A shows the variation, in time t1 to t9, of the two-phase high-frequency voltages A, B supplied to the vibration motor, wherein the abscissa indicates the effective value of the high-frequency voltages. FIG. 9B shows the deformation of the cross section of the vibration motor, and indicates the variation in time (t1 to t9) of the bending vibration generated in the vibration motor. FIG. 9C shows the deformation of the cross section of the ultrasonic vibration motor, and indicates the variation in time (t1 to t9) of the longitudinal vibration generated in the vibration motor. FIG. 9D indicates the variation in time (t1 to t9) of the elliptical movements generated in the protruding portions 11b, 11c of the vibration motor.

The variation in time (t1 to t9) of the operation of the vibration motor of the present embodiment will not be explained further as it is similar to that already explained in relation to FIGS. 6A to 6D.

Figure 21B:
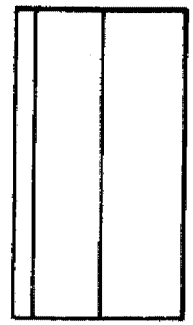
FIGS. 21A, 21B and 21C are schematic views showing a conventional example of a longitudinal L1—bending B4 mode flat-plate motor.
Figure 21A:
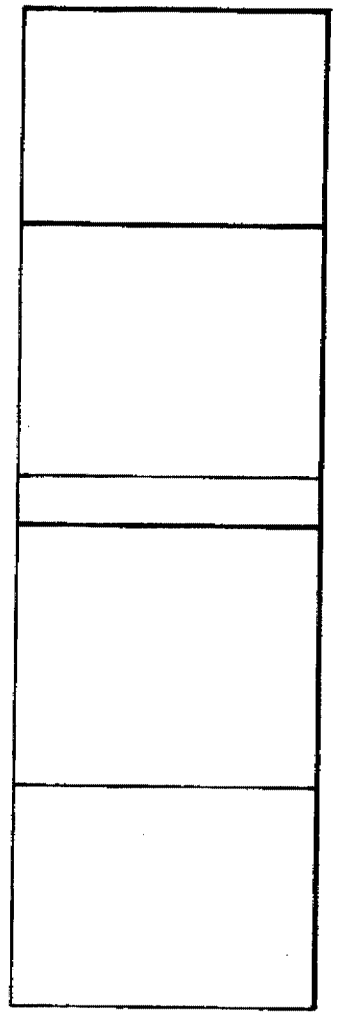
Figure 21C:
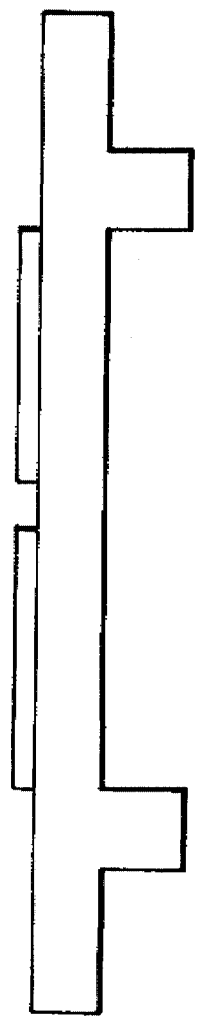
Figure 22:
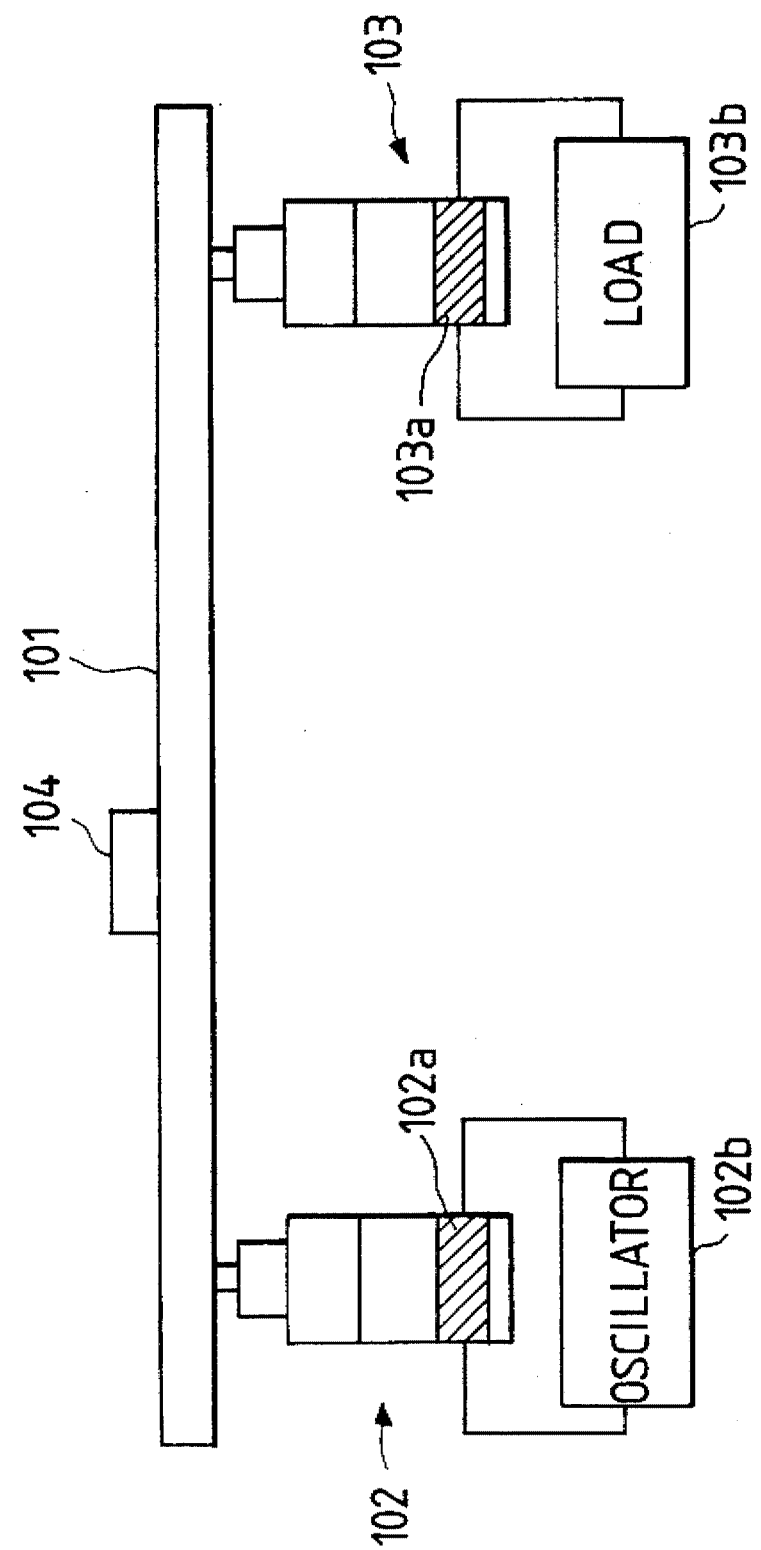
FIG. 22 is a view showing a conventional example of the vibration linear actuator.

In the fifth embodiment, since the piezoelectric elements 12-1, 13-1 and 12-2, 13-2 are adhered on two faces of the elastic member 11, the bending vibration can be increased under a same applied voltage to increase the driving force, in comparison with the motor having the piezoelectric elements only on one face of the elastic member as shown in FIGS. 21A, 21B and 21C.

[Sixth embodiment]

Figure 10:
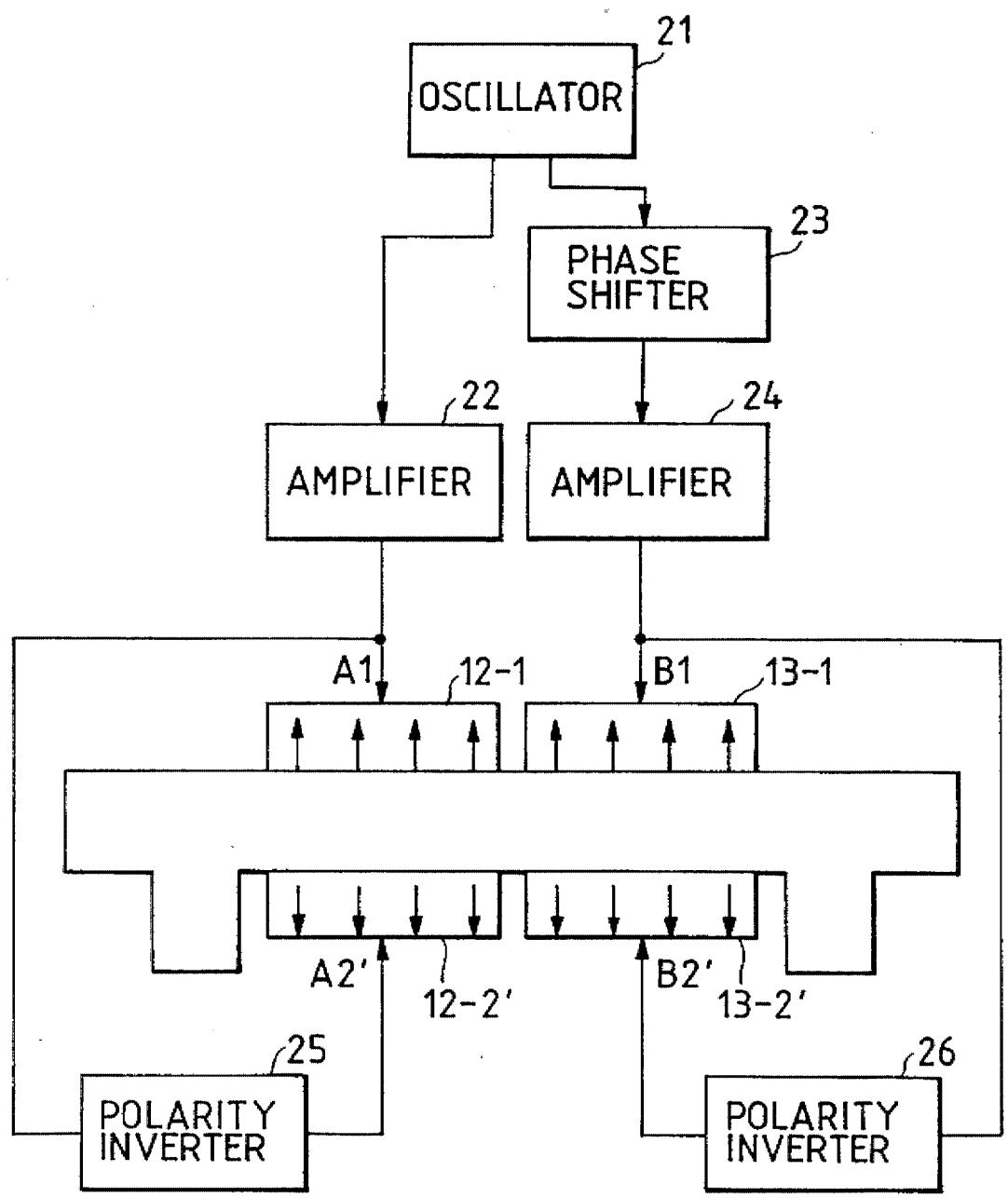
FIG. 10 is a block diagram of a sixth embodiment of the vibration motor of the present invention.

FIG. 10 is a block diagram of a sixth embodiment of the vibration motor of the present invention. In the following embodiments, components equivalent in function to those in the fifth embodiment will be represented by the same numbers and will not be explained further.

In the sixth embodiment, piezoelectric elements 12-2', 13-2' are polarized in mutually opposite directions relative to the piezoelectric elements 12-1 and 13-1. In such a case, if the elements 12-2', 13-2' are given the AC voltages of a phase relationship the same as those given to the piezoelectric elements 12-1, 13-1, both elements expand or contract at the same time. For this reason the elements 12-2', 13-2' are given the driving voltages of which polarity is respectively inverted by polarity inverters 25, 26.

[Seventh embodiment]

Figure 11A:
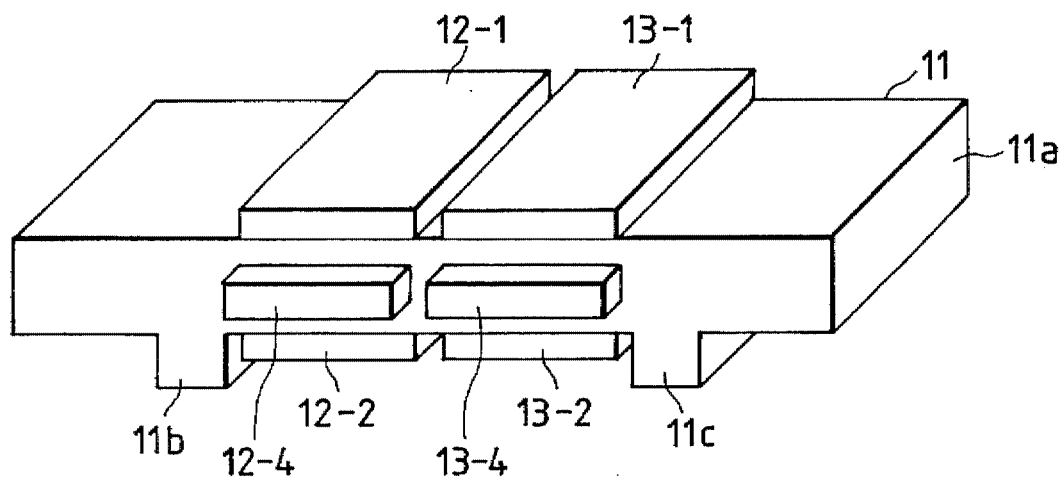
FIGS. 11A and 11B are schematic views of a seventh embodiment of the vibration motor of the present invention.
Figure 11B:
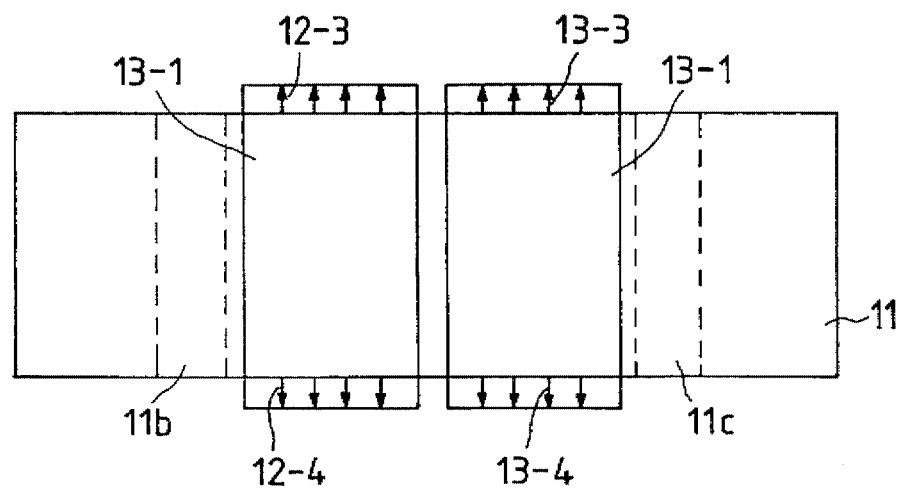

FIGS. 11A and 11B are schematic views of a seventh embodiment of the vibration motor of the present invention.

In the seventh embodiment, an elastic member 11 bears piezoelectric elements 12-3, 13-3; 12-4, 13-4 also on both lateral faces of the elastic member with respect to the moving direction thereof. The elements 12-3, 12-4 are so polarized as to generate expansion or contraction in a same phase when given a voltage the same as that supplied to the piezoelectric element 12-1, and the elements 13-3, 13-4 are polarized in the same manner in relation to the element 13-1. The AC voltage of the phase A is given to the piezoelectric elements 12-1, 12-3, 12-4 while the AC voltage of the phase B is given to the elements 13-1, 13-3, 13-4 thereby enhancing the longitudinal vibration and increasing the driving speed.

In case the piezoelectric elements 12-3, 12-4; 13-3, 13-4 are polarized in the opposite manner to the foregoing explanation, the voltages of the phases A, B may be entered through polarity inverters as shown in FIG. 10. Also, the piezoelectric elements 12-3, 13-3 or 12-4, 13-4 may be provided only on one side face of the elastic member 11, instead of both side faces.

[Eighth embodiment]

Figure 12:
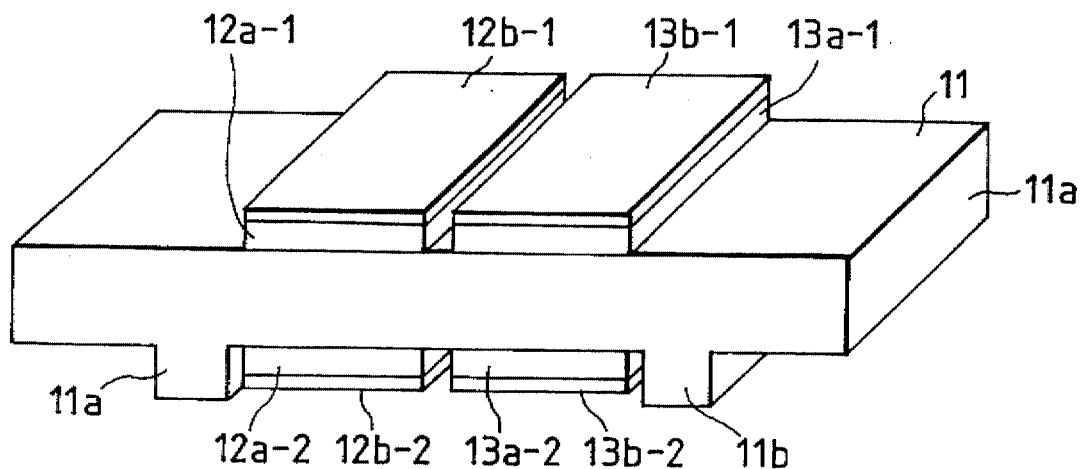
FIG. 12 is a schematic view of an eighth embodiment of the vibration motor of the present invention.

FIG. 12 is a schematic view of an eighth embodiment of the vibration motor of the present invention, wherein piezoelectric materials 12a-1, 13a-1; 12a-2, 13a-2 and electrodes 12b-1, 13b-1; 12b-2, 13b-2 are provided as the piezoelectric elements 12-1, 13-1; 12-2, 13-2.

[Ninth embodiment]

Figure 13:
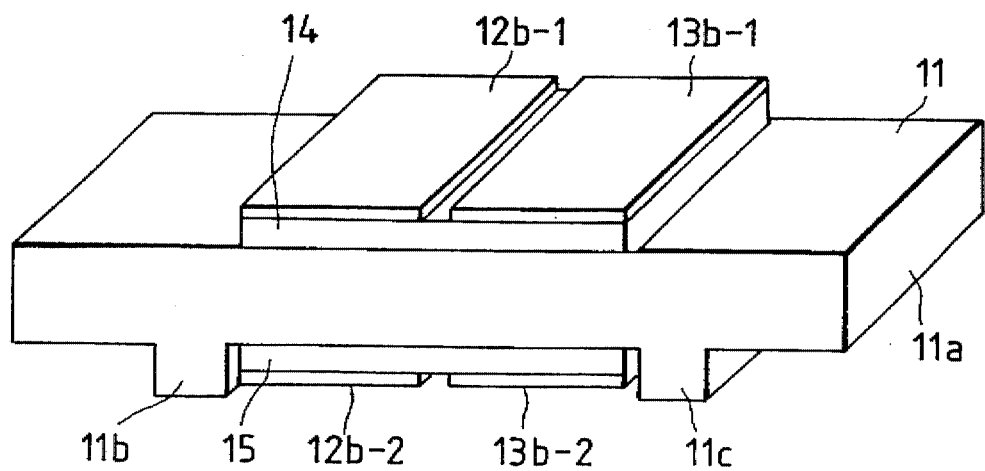
FIG. 13 is a schematic view of a ninth embodiment of the vibration motor of the present invention.

FIG. 13 is a schematic view of a ninth embodiment of the vibration motor of the present invention, wherein piezoelectric materials 14, 15 are respectively adhered on the upper and lower faces of an elastic member 11, and divided electrodes 12b-1, 13b-1; 12b-2, 13b-2 are formed respectively on said piezoelectric materials 14, 15. In this manner, there can be employed only one piezoelectric material 14 or 15 on each side, so that the adhering operation can be simplified and the operation efficiency can be improved.

In the present embodiment, as explained above, a second electromechanical converting element is adhered on a face of the elastic member, different from the face thereof bearing a first electromechanical converting element, so that the deformations by the bending and longitudinal vibrations become larger for a same applied voltage, thus increasing the driving force and the driving speed. Therefore, even when the motor is used with a high torque and a high speed, there can be suppressed the heat generation and prevented the destruction of the polarization of the electromechanical converting elements.

[Tenth embodiment]

Figure 14A:
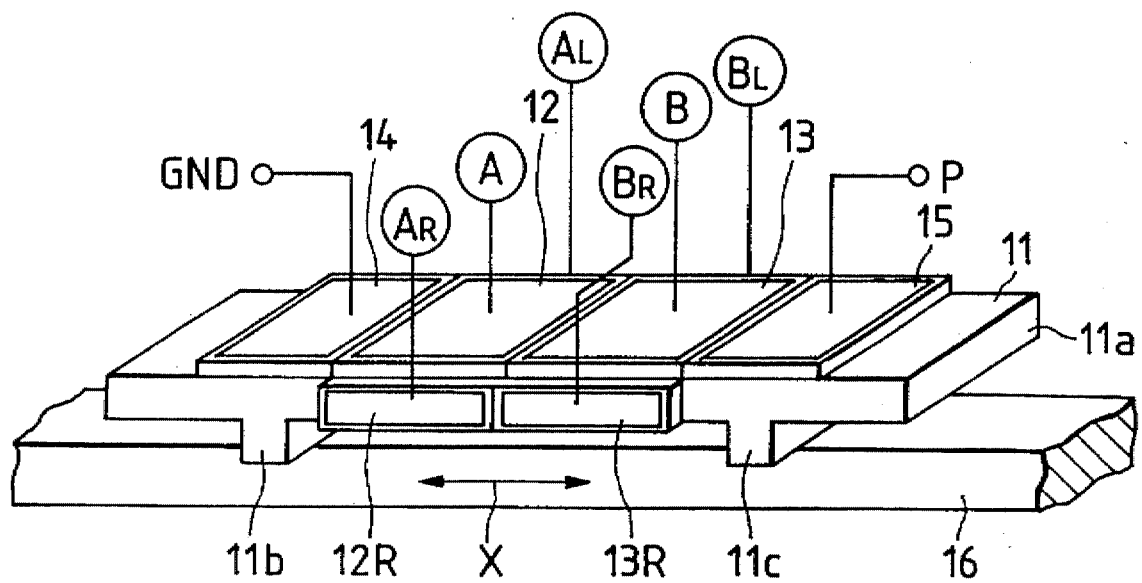
FIGS. 14A and 14B are schematic views of a tenth embodiment of the vibration motor and of vibration actuator according to the tenth embodiment of the present invention.
Figure 14B:
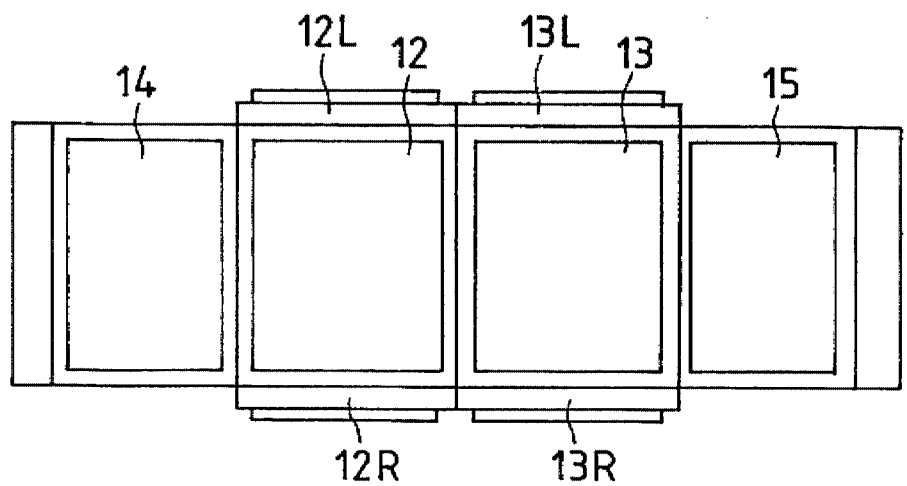

In the following there will be given a detailed explanation on of a tenth embodiment of the present invention, with reference to the attached drawings FIGS. 14A and 14B are schematic views showing an embodiment of the vibration actuator of the present invention.

An elastic member 11 is provided with a base portion 11a and two protruding portions (driving force output portions) 11b, 11c, and is formed, for example, of a metal such as stainless steel or an aluminum alloy, or a plastic material.

The elastic member 11 bears main piezoelectric elements 12, 13 on the upper face (1st face) of the base portion 11a, and corresponding to the main piezoelectric members, sub piezoelectric members 12R, 13R, and 12L, 13L respectively on a right lateral face (2nd face) and on a left lateral face (3rd face) of the base portion 11a, with respect to the travelling direction X thereof.

Also a grounding piezoelectric element 14 and a detecting piezoelectric element 15 are provided respectively behind and in front of the main piezoelectric elements 12, 13, on the upper (1st) face of the base portion 11a, with respect to the travelling direction thereof.

The main piezoelectric elements 12, 13 constitute the electromechanical converting elements for generating the longitudinal vibration of L1 mode and the bending vibration of B4 mode, and respectively receive the voltages of terminals A and B.

Figure 16A:
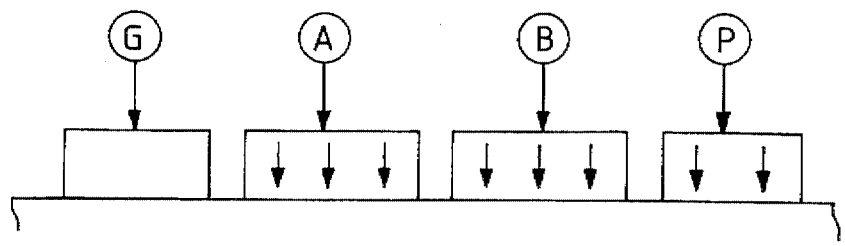
FIGS. 16A and 16B are views, in the polarizing direction, of an electromechanical converting element in the vibration actuator of the tenth embodiment.

In this embodiment, the main piezoelectric elements 12, 13 are polarized, as shown in FIG. 16A, in the direction of thickness (towards the adhering face) and in mutually the same manner. The voltages of the terminals A and B have a same frequency but are different by $\pi/2$ in phase. The two piezoelectric elements may also be polarized in mutually opposite directions.

Figure 16B:
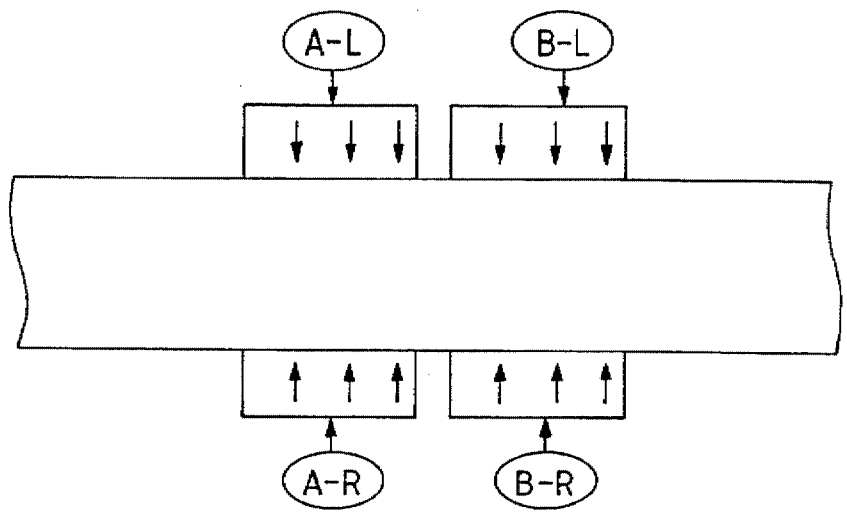
Figure 17A:
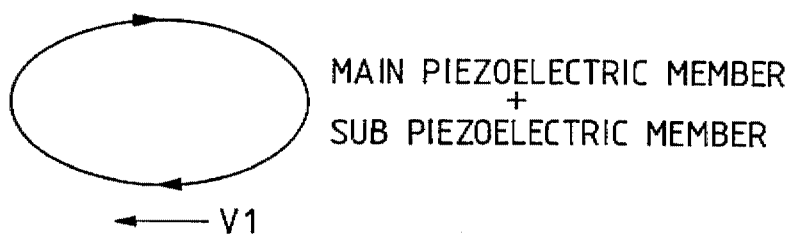
FIGS. 17A, 17B and 17C are views showing the function of a sub electromechanical converting element in the vibration actuator of the tenth embodiment.
Figure 17B:
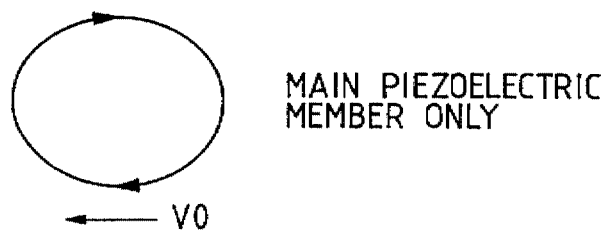
Figure 17C:
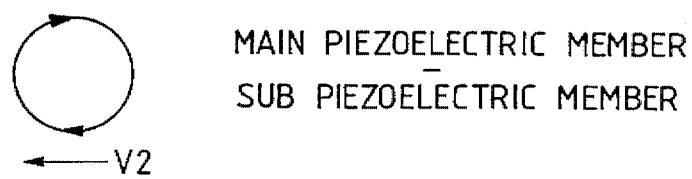

The sub piezoelectric elements 12R, 13R; 12L, 13L are polarized in the direction of thickness as shown in FIG. 16B, and the direction of polarization of the elements 12R, 12L is also oriented toward the adhering face, similar to that of the main element 12, while that of the elements 13R, 13L is also oriented toward the adhering face, similar to that of the main element 13. When the direction of polarization of the main element 12 is oriented away from the adhering face, that of the elements 12R, 12L is also oriented away therefrom, and when the direction of polarization of the main element 13 is oriented away from the adhering face, that of the elements 13R, 13L is also oriented away therefrom. This situation is the same as in FIGS. 16A and 16B in that the direction of polarization of the main piezoelectric elements with respect to the adhering face is the same as that of the corresponding sub piezoelectric elements.

The grounding piezoelectric element 14 is provided for grounding, and, different from other elements, is not subjected to the polarization process, thereby lacking the electromechanical converting function. In the piezoelectric element 14, a surface electrode and the elastic member 11 are electrically connected, for example, with conductive paint. Such an unpolarized piezoelectric element 14 is employed in order to achieve a weight balance with the detecting piezoelectric element 15 to be explained later, thereby generating elliptical movements of a substantially same shape on the driving faces of the two protruding portions 11b, 11c and eliminating the difference in the two driving forces in case of a reciprocating motion.

The detecting piezoelectric element 15 converts the vibration state of the elastic member 11 into an electrical signal for transmission to a terminal P. The electrical signal contains the two different vibration modes, namely the vibration state of a 4th-order bending vibration mode and that of a 1st-order longitudinal vibration mode, in composite form, and has a magnitude substantially corresponding to the amplitude of synthesized vibration of the elastic member 11.

FIGS. 15A, 15B, 15C and 15D show the function of the ultrasonic actuator of the present invention.

At first, there will be explained the driving operation by the main piezoelectric elements 12, 13 and then the function of the sub elements 12R, 13R, 12L, 13L.

FIG. 15A shows the variation, in time t1 to t9, of the two-phase high-frequency voltages A, B supplied to the vibration actuator, wherein the abscissa indicates the effective value of said high-frequency voltages. FIG. 15B shows the deformation of the cross section of the ultrasonic actuator, and indicates the variation in time (t1 to t9) of the bending vibration generated in the vibration actuator. FIG. 15C shows the deformation of the cross section of the ultrasonic actuator, and indicates the variation in time (t1 to t9) of the longitudinal vibration generated in the vibration actuator. FIG. 15D indicates the variation in time (t1 to t9) of the elliptical movements generated in the protruding portions 11b, 11c of the vibration actuator.

The variation in time (t1 to t9) of the function of the vibration actuator of this embodiment will not be explained further, as it is similar to that already explained in relation to FIGS. 6A to 6D.

Based on the above-explained principle, this vibration actuator generates elliptical movements at the ends of the protruding portions 11b, 11c, thereby generating a driving force. Consequently, if the ends of the protruding portions 11b, 11c are pressed to a relative movement member 16, the elastic member 11 runs relative to said member 16.

Thus, the main piezoelectric elements 12, 13 are excited by driving voltages to generate, in the elastic member 11, a longitudinal vibration and a bending vibration, which respectively generate a movement component in the driving direction and a movement component in a perpendicular direction, thus creating elliptical movement.

In the vibration actuator of this embodiment, the sub piezoelectric elements 12R, 13R, 12L, 13L, being adhered to faces (2nd and 3rd faces) substantially parallel to the vibrating direction of the bending vibration, do not generate a movement component perpendicular to the driving direction but only increase the movement component of the elliptical movement.

The addition of the vibration components of the sub piezoelectric elements 12R, 13R, 12L, 13L to those of the main piezoelectric elements (cf. FIGS. 15A to 15D and 17B) expands or contracts the elliptical movement in the driving direction, thereby increasing or decreasing the driving force of the relative movement member 16, maintained in pressure contact with the protruding portions 11b, 11c of the elastic member 11.

In the following there will be explained the driving method of the vibration actuator of the tenth embodiment.

Figure 18:
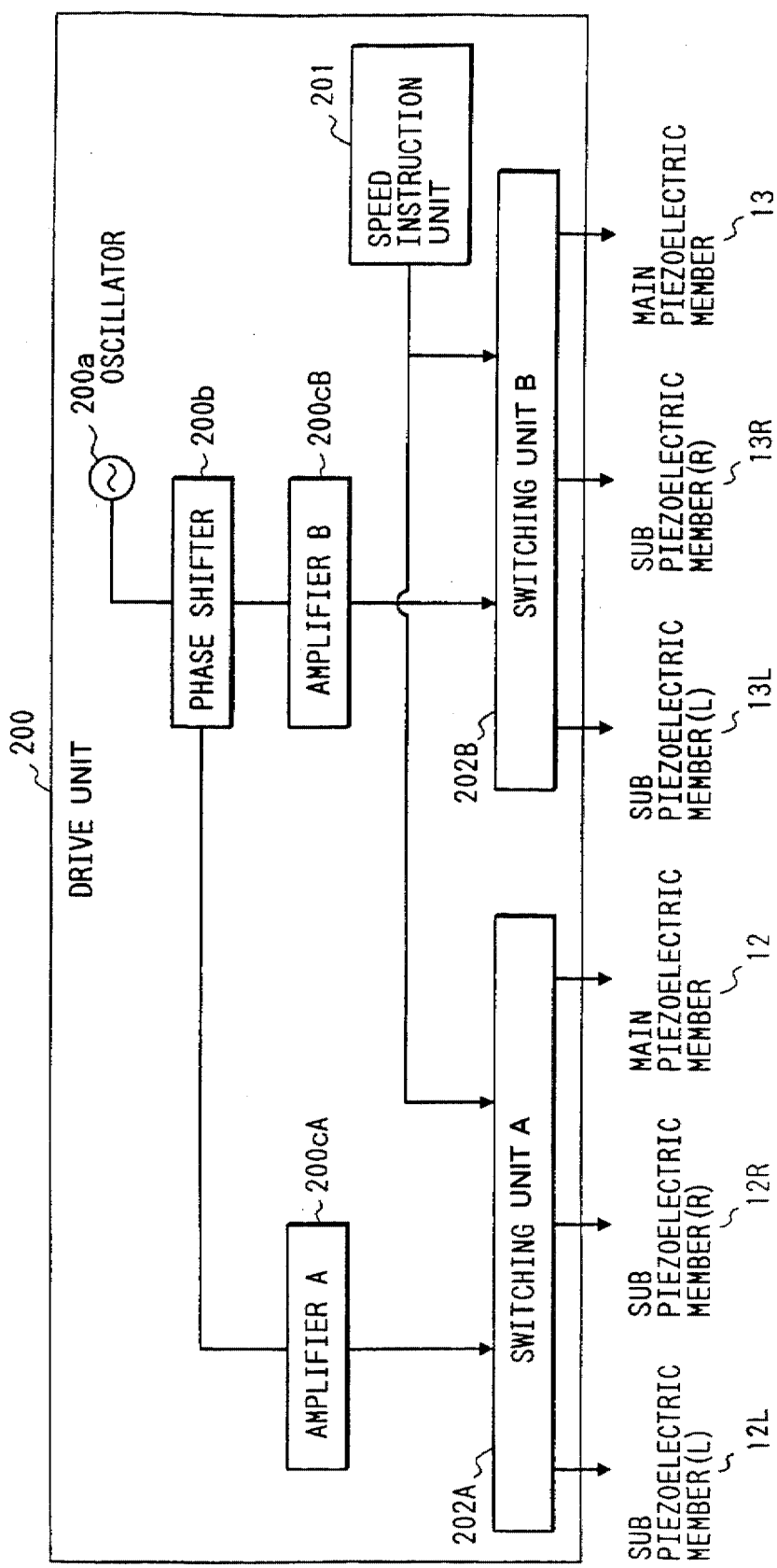
FIG. 18 is a block diagram of a driving circuit of the vibration actuator of the tenth embodiment.
Figure 19:
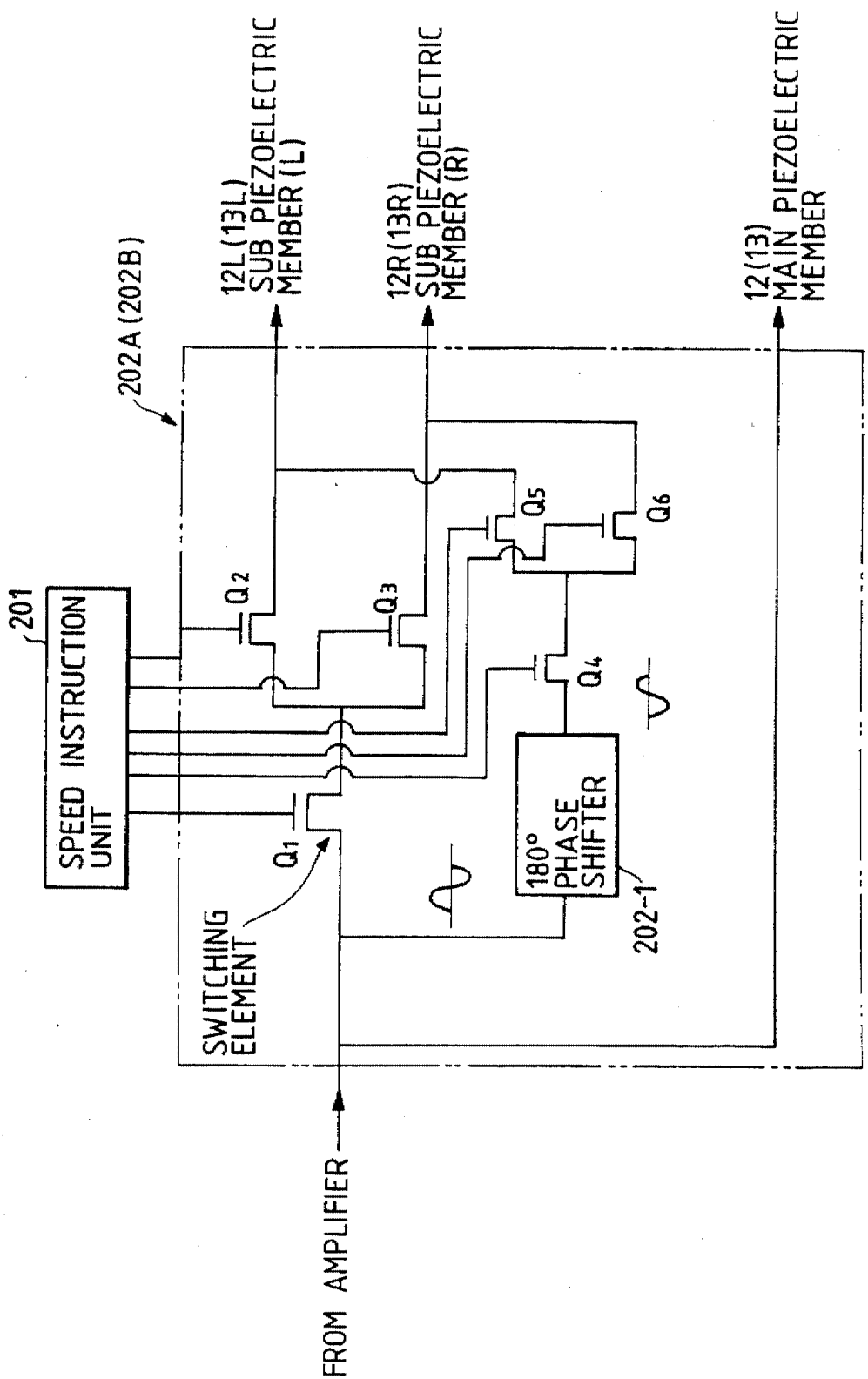
FIG. 19 is a block diagram showing the driving circuit (switching unit) of the vibration actuator of the tenth embodiment.

FIGS. 18 and 19 are views showing the driving circuit for the vibration actuator of the tenth embodiment, and FIG. 20 is a view showing the function of a switching unit for the vibration actuator.

A drive signal from an oscillator 200a is supplied to a phase shifter 200b for division into signals with a phase difference of ¼ of the wavelength, and the signals are respectively supplied to amplifiers 200cA, 200cB. The drive signals thus amplified are respectively supplied to switching unit 202A, 202B, and the output of the switching unit 202A is supplied to the main piezoelectric element 12 and the sub elements 12R, 12L while that of the switching unit 202B is supplied to the main element 13 and the sub elements 13R, 13L.

In the following, the switching unit 202A will be explained with reference to FIG. 19. The switching unit 202B will not be explained as the circuit configuration therefor is the same.

The drive signal from the amplifier is branched into two, one of which is directly supplied to the main piezoelectric element 12, while the other is further branched into two, wherein one is guided through a switching element Q1 and further branched for supply to the sub piezoelectric elements 12L, 12R through switching elements Q2, Q3.

The drive signal branched to a 180° phase shifter 202-1 is further branched by a switching element Q4 for supply to the sub piezoelectric elements 13L, 13R through switching elements Q5, Q6.

A speed instruction unit 201 switches the drive signal by on/off control of the switching elements Q1–Q6 of the switching unit 202A (202B).

The switching elements Q1–Q6, when on/off controlled as shown in FIG. 20, can decrease or increase the components of the elliptical movement, thereby controlling the driving speed or the driving force.

More specifically, when the switching elements Q1–Q3 are turned off while the elements Q4–Q6 are turned on, the main elements 12, 13 receive the output (positive) signal of the oscillator 200a while the sub elements 12L, 13L; 12R, 13R receive a signal (inverted) with a phase shift of 180° by the phase shifter 202-1, whereby the speed becomes "slow".

When the switching elements Q1–Q3 and Q6 are turned off while the switching elements Q4 and Q5 are turned on, the main elements 12, 13 receive the positive signal; the sub elements 12L, 13L receive the inverted signal; and the sub elements 12R, 13R do not receive the signal, whereby the speed becomes "somewhat slow".

When all the switching elements Q1–Q6 are turned off, the main elements 12, 13 receive the positive signal but the sub elements 12L, 13L; 12R, 13R do not receive the signal, so that the speed becomes "normal" (same as in the case of FIGS. 15A to 15D).

When the switching elements Q1, Q2 are turned on while the elements Q3–Q6 are turned off, the main elements 12, 13 receive the positive signal; the sub elements 12L, 13L receive the positive signal; and the sub elements 12R, 13R do not receive the signal, whereby the speed becomes "somewhat fast".

When the switching elements Q1–Q3 are turned on while the elements Q4–Q6 are turned off, all the main elements 12, 13 and the sub elements 12L, 13L; 12R, 13R receive the positive signal, whereby the speed becomes "fast".

In this manner, the driving speed and the driving force can be controlled without a change in the frequency or voltage of the drive signal.

The present invention is not limited to the foregoing embodiments but is subjected to various modifications and variations, which are also included in the present invention.

For example, the piezoelectric member is employed as the electromechanical converting element in the foregoing embodiments, but an electrorestrictive element may be employed instead.

Also in the foregoing embodiments, the polarizing directions of the main piezoelectric element and the sub piezoelectric element are selected the same in relation to the corresponding adhering face, but, even if the main and sub elements have mutually opposite polarizing directions, a same effect can be obtained by suitably regulating the polarities of the applied voltage. For example, when the main and sub piezoelectric elements have mutually opposite polarizing directions, there can be applied a same voltage to the main and sub elements for decreasing the speed, or opposite voltages to the main and sub elements for increasing the speed.

Also, there have been explained the L1-B4 modes as an example of the different vibration modes, but there may also be employed other vibration modes such as L1-B2, L1-B6, L1-B8 or L2-B4 modes.

Also, the present invention has been explained by embodiments utilizing the L1-B4 vibration modes, but it is likewise applicable to an annular ultrasonic vibration motor in which a travelling vibration wave is generated on the surface of an elastic member by an electromechanical converting element.

Also, the present invention has been explained by a self-running motor, but it is likewise applicable to a configuration in which the elastic member is fixed and a long relative moving member is moved.

As explained in the foregoing, the tenth embodiment is provided, in addition to the main electromechanical converting elements for generating an elliptical movement including of a component in the driving direction and a component in the perpendicular direction, in the elastic member, with the sub electromechanical converting elements for generating a movement component in the driving direction, whereby the elliptical movement can be expanded or contracted in the driving direction, thereby increasing or decreasing the driving force and thus controlling the driving force or the driving speed.

The sub electromechanical converting elements, being provided on a face (2nd or 3rd face) substantially parallel to the direction of amplitude of the bending vibration, do not generate a bending movement creating a perpendicular component to the driving direction of the elliptical movement of the driving force output portions but can increase or decrease only the component in the driving direction of the elliptical movement, thereby enabling efficient control of the driving force or the driving speed.

Also, the drive signal to the sub electromechanical converting elements includes of a first frequency signal and a second frequency signal which is different by 180° in phase from the first signal, and each electromechanical converting element selectively receives the supply of the first or second signal or no signal. Consequently the component of the elliptical movement in the driving direction can be increased or decreased, or used without change, so that the driving speed can be controlled in plural levels of fast, normal and slow or of fast, somewhat fast, normal, somewhat slow and slow.

What is claimed is:

1. A vibration motor comprising:

an elastic member having a pair of driving output portions extending perpendicularly from a first face thereof;

a first electromechanical converting element adhered on the first face of said elastic member and between said pair of driving output portions, to harmonically generate a longitudinal vibration mode and a bending vibration mode in said elastic member; and a second electromechanical converting element adhered on a second face of said elastic member, other than the first face on which said first electromechanical converting element is adhered to said elastic member;

wherein the directions of polarization of said first and second electromechanical converting elements are substantially orthogonal to the direction of driving of said vibration motor; and said first and second electromechanical converting elements are substantially equidistant from a plane perpendicular to the direction of driving of said vibration motor.

2. The vibration motor according to claim 1, wherein:

said elastic member is shaped as a flat plate; and said second face of said elastic member is opposite to the first face of said elastic member on which said first electromechanical converting element is adhered.

3. The vibration motor according to claim 1, wherein:

said elastic member is shaped as a flat plate; and said second electromechanical converting element is adhered on at least one lateral face of said elastic member with respect to the moving direction thereof.

4. The vibration motor according to claim 1, wherein said second electromechanical converting element harmonically generates the longitudinal vibration mode and the bending vibration mode in said elastic member in conjunction with said first electromechanical converting element.

5. The motor according to claim 2, wherein said first electromechanical converting element includes a first set of two pieces of electromechanical conversion elements disposed along the longitudinal direction of said elastic member;

said second electromechanical converting element includes a second set of two pieces of electromechanical conversion elements, each of which is disposed at a region of said elastic member opposite to respective ones of said first set of two pieces of said first electromechanical conversion element; and a signal generator to apply a same phase of first drive signals to a first one of each of said first and second sets of two pieces of electromechanical conversion elements opposite to each other and a same phase of second drive signals to a second one of each of said first and second sets of two pieces of electromechanical conversion elements opposite to each other, wherein said first drive signals have a different phase from said second drive signals.

6. The vibration motor according to claim 1, wherein:

said first electromechanical converting element has a first electromechanical converting portion and a second electromechanical converting portion;

said second electromechanical converting element has a third electromechanical converting portion and a fourth electromechanical converting portion;

the directions of polarization of said first and second electromechanical converting portions are oriented away from the adhering faces thereof with said elastic member;

the directions of polarization of said third and fourth electromechanical converting portions are oriented toward the adhering faces thereof with said elastic member;

said first and third electromechanical converting portions are substantially equidistant from the plane perpendicular to the direction of driving of said vibration motor, said first and third electromechanical converting portions being excited by a first alternating voltage; and said second and fourth electromechanical converting portions are substantially equidistant from the plane perpendicular to the direction of driving of said vibration motor, said second and fourth electromechanical converting portions being excited by a second alternating voltage whose phase differs from that of said first alternating voltage.

7. The vibration motor according to claim 1, wherein:

said first electromechanical converting element has a first electromechanical converting portion and a second electromechanical converting portion;

said second electromechanical converting element has a third electromechanical converting portion and a fourth electromechanical converting portion;

the directions of polarization of said first and fourth electromechanical converting portions are oriented away from the adhering faces thereof with said elastic member;

said first and third electromechanical converting portions are substantially equidistant from the plane perpendicular to the direction of driving of said vibration motor;

said second and fourth electromechanical converting portions are substantially equidistant from the plane perpendicular to the direction of driving of said vibration motor;

said first electromechanical converting portion is excited by a first alternating voltage, said second electromechanical converting portion is excited by a second alternating voltage whose phase differs from that of said first alternating voltage, said third electromechanical converting portion is excited by a third alternating voltage whose polarity is opposite to that of said first alternating voltage; and said fourth electromechanical converting portion is excited by a fourth alternating voltage whose polarity is opposite to that of said second alternating voltage.

8. The vibration motor according to claim 1, wherein:

said elastic member is shaped as a flat plate;

said first electromechanical converting element has first and second electromechanical converting portions adhered on the first face;

said second electromechanical converting element has third and fourth electromechanical converting portions adhered on the second face;

said vibration motor further comprising a third electromechanical converting element having fifth and sixth electromechanical converting portions adhered on one of lateral faces of said elastic member with respect to the moving direction thereof, and a fourth electromechanical converting element having seventh and eighth electromechanical converting portions adhered on the other of the lateral faces of said elastic member with respect to the moving direction thereof;

wherein the directions of polarization of said fifth to eighth electromechanical converting portions are oriented away from the adhering faces thereof with said elastic member.

9. The vibration motor according to claim 1, wherein:

said elastic member is shaped as a flat plate;

said first electromechanical converting element has first and second electromechanical converting portions adhered on the first face;

said second electromechanical converting element has third and fourth electromechanical converting portions adhered on the second face;

said vibration motor further comprising a third electromechanical converting element having fifth and sixth electromechanical converting portions adhered on one of lateral faces of said elastic member with respect to the moving direction thereof, and a fourth electromechanical converting element having seventh and eighth electromechanical converting portions adhered on the other of lateral faces of said elastic member with respect to the moving direction thereof;

wherein the directions of polarization of said fifth to eighth electromechanical converting portions are oriented toward the adhering faces thereof with said elastic member.

10. A vibration actuator comprising:

a driving force circuit which generates a main drive signal and a sub drive signal;

a main electromechanical converting element to be driven by said main drive signal;

a sub electromechanical converting element to be driven by said sub drive signal;

an elastic member having a first face, a second face and a driving force output portion, wherein said main electromechanical converting element is adhered to said first face, said driving force output portion extends perpendicularly from said first face and said sub electromechanical converting element is adhered to said second face; and a drive signal switching circuit which controls supply of said main drive signal to said main electromechanical converting element and controls selective supply of said sub drive signal to said sub electromechanical converting element;

wherein said main electromechanical converting element generates, in said driving force output portion of said elastic member, an elliptical movement including a component in the driving direction and a component in a direction perpendicular to the driving direction;

said sub electromechanical converting element generates, in said driving force output portion of said elastic member, a movement only of a component in the driving direction; and the direction of polarization of said main electromechanical converting element is substantially orthogonal to the direction of driving of said vibration actuator and the direction of polarization of said sub electromechanical converting element is substantially orthogonal to said second face.

11. The vibration actuator according to claim 10, wherein:

said sub drive signal includes a first frequency signal and a second frequency signal different by 180° in phase from said first frequency signal; and said drive signal switching circuit selectively switches between three modes, i.e., the supply of one of said first frequency signal, said second frequency signal and no signal, to each of said first and second sub electromechanical converting elements.

12. A vibration actuator comprising:

a driving force circuit which generates a main drive signal and a sub drive signal;

a main electromechanical converting element to be driven by said main drive signal;

first and second sub electromechanical converting elements to be driven by said sub drive signal;

an elastic member having a first face, a second face, a third face and a driving force output portion, wherein said driving force output portion extends perpendicularly from said first face and said main electromechanical converting element is adhered to said first face and said first and second sub electromechanical converting elements are adhered to said second and third faces, respectively; and a drive signal switching circuit which controls supply of said main drive signal to said main electromechanical converting element and controls selective supply of said sub drive signal to said first and second sub electromechanical converting elements;

wherein said main electromechanical converting element generates, in said driving force output portion of said elastic member, an elliptical movement including a component in the driving direction and a component in a direction perpendicular to the driving direction;

said first and second sub electromechanical converting elements generate, in said driving force output portion of said elastic member, movement only of a component in the driving direction; and the direction of polarization of said main electromechanical converting element is substantially orthogonal to the direction of driving of said vibration actuator and the directions of polarization of said first and second sub electromechanical elements are substantially orthofional to said second and third faces, respectively.

13. The vibration actuator according to claim 12, wherein at least one of said second and third faces of said elastic member is parallel to the component in the perpendicular direction of said elliptical movement.

14. The vibration motor according to claim 12, wherein:

said elastic member is shaped as a flat plate;

said second face is one of lateral faces of said elastic member with respect to the moving direction thereof;

said third face is the other of the lateral faces of said elastic member with respect to the moving direction thereof; and the directions of polarization of said first and second sub electromechanical converting elements are oriented toward the adhering faces thereof with said elastic member.

* * * * *

UNITED STATES PATENT AND TRADEMARK OFFICE
CERTIFICATE OF CORRECTION

PATENT NO. : 5,672,930

DATED : September 30, 1997

INVENTOR(S) : Tsutomu NARISAWA et al.

It is certified that error appears in the above-identified patent and that said Letters Patent is hereby corrected as shown below:

Col. 16, line 18 (claim 12), delete "orthofional" and insert --orthogonal--.

Signed and Sealed this

Tenth Day of March, 1998

Attest:

BRUCE LEHMAN

*Attesting Officer*       *Commissioner of Patents and Trademarks*